United States Patent
Auguet et al.

(10) Patent No.: US 7,096,098 B2
(45) Date of Patent: Aug. 22, 2006

(54) TRACTION CHAIN FOR A SERIES HYBRID VEHICLE

(75) Inventors: Thierry Auguet, Chapelle Glâne (CH); Jean-Louis Linda, La Tour-de-Treme (CH); Pierre Varenne, Neyrus (CH)

(73) Assignee: Conception Et Developpement Michelin S.A., Givisiez (CH)

( * ) Notice: Subject to any disclaimer, the term of this patent is extended or adjusted under 35 U.S.C. 154(b) by 418 days.

(21) Appl. No.: 10/732,014

(22) Filed: Dec. 10, 2003

(65) Prior Publication Data

US 2004/0147363 A1  Jul. 29, 2004

(30) Foreign Application Priority Data

Dec. 11, 2002  (FR) .................................. 02 15878

(51) Int. Cl.
*B60L 9/00* (2006.01)
(52) U.S. Cl. ................ 701/22; 701/101; 180/65.2; 180/65.8; 477/2
(58) Field of Classification Search ................ 701/22, 701/36, 99, 109, 110; 180/65.1–65.8; 477/2, 477/3
See application file for complete search history.

(56) References Cited

U.S. PATENT DOCUMENTS

| | | | |
|---|---|---|---|
| 5,545,928 A | 8/1996 | Kotani | 290/40 |
| 5,927,416 A | 7/1999 | del Re et al. | 180/65.2 |
| 6,209,672 B1 * | 4/2001 | Severinsky | 180/65.2 |
| 6,230,496 B1 * | 5/2001 | Hofmann et al. | 60/706 |
| 6,554,088 B1 * | 4/2003 | Severinsky et al. | 180/65.2 |
| 6,591,758 B1 * | 7/2003 | Kumar | 105/35 |
| 6,692,403 B1 * | 2/2004 | Charaudeau et al. | 477/3 |
| 6,885,920 B1 * | 4/2005 | Yakes et al. | 701/22 |
| 6,973,880 B1 * | 12/2005 | Kumar | 105/35 |
| 2002/0183161 A1 | 12/2002 | Charaudeau et al. | 477/3 |

FOREIGN PATENT DOCUMENTS

| | | |
|---|---|---|
| EP | 0556942 | 8/1993 |
| EP | 0901930 | 3/1999 |
| EP | 1013498 | 6/2000 |
| EP | 1199205 | 4/2002 |
| EP | 1241043 | 9/2002 |

\* cited by examiner

*Primary Examiner*—Richard M. Camby
(74) *Attorney, Agent, or Firm*—Fitzpatrick, Cella, Harper & Scinto

(57) ABSTRACT

Traction chain for a series hybrid vehicle comprising an engine (10) which drives an alternator (11), an electric traction motor (21), a inverter which enables the electric traction motor to be operated at a torque set value $CC_{set}$, an accelerator available for use by the driver of the vehicle, an actuator (15) which acts on the engine, a controller (3) for the traction chain loaded with a model of the engine's operation and loaded with a program which, from the position of the accelerator, allows a pair ($R_{th/set}$, $PP_{set}$) of set values to be obtained for the revolution speed $R_{th}$ of the engine and for the position of the actuator (15), the said controller making it possible to control the position of the said actuator on the basis of the said set value $PP_{set}$ for the position of the actuator and to calculate a torque set value $CC_{set}$ for the electric traction motor or motors as a function of the deviation between the measured speed $R_{th}$ and the set value $R_{th/set}$ for the revolution speed of the engine.

13 Claims, 6 Drawing Sheets

TRACTION CHAIN FOR A SERIES HYBRID VEHICLE

BACKGROUND OF THE INVENTION

The present invention concerns automobile road vehicles, with series hybrid motorization. In vehicles of this type an engine drives an electric alternator which transforms the mechanical energy delivered by the output shaft of the engine into electrical energy. This electrical energy powers one or more electric traction motors, which are mechanically connected to the drive wheels of the vehicle. The engine is not mechanically connected to the wheels, in contrast to vehicles with parallel hybrid motorization, in which a engine and an electric motor are both connected mechanically to the drive wheels so that the torques they deliver can act additively to drive the drive wheels.

Drivers of classically motorized automobile vehicles ("classically motorized" is understood here to mean a engine and a mechanical or automatic gearbox) are familiar with the acceleration and braking controls well known in the state of the art. These controls have attained a high degree of progressiveness and reactivity. It is desirable for a hybrid vehicle to be able to be driven in essentially the same way if one wishes not to confuse a driver used to the classical motorizations. This entails transforming the driver's actions on the accelerator pedal (and if necessary the brake) into appropriate actions on the traction chain that begins at the and ends at one or more electric traction motors.

It is well known to fit a battery of electric accumulators as a buffer between the alternator and the electric motor, particularly in the case when it is desired to be able to drive the vehicle in the purely electric mode, with the engine cut off. In that case the controls of the engine and the electric traction motor can be independent. There is no particular problem in controlling the torque of an electric motor which draws its energy from a battery of electric accumulators, with all the progressiveness and reactivity desired at the accelerator pedal available for the driver's use.

But the use of a battery of electric accumulators raises different problems. Such a battery is heavy in relation to the quantity of electrical energy stored. This considerably increases the mass of a vehicle and is a source of waste during accelerations, not to speak of problems related to the dynamic behavior of a vehicle, which are the more crucial the heavier the vehicle is. In addition, such batteries pose maintenance problems and problems for the environment because of the many materials they contain which are polluting and difficult to recycle.

The purpose of the present invention is thus to design a series hybrid traction chain that can if necessary operate without a battery of electric accumulators, while providing the driver of the vehicle with a very progressive and very reactive accelerator control. In the case when no reservoir of electrical energy (battery) is available, it is necessary to be able to produce just that electrical energy which is required for the demand. The problem arising is therefore to obtain the desired torque from the electric traction motor while avoiding stalling or racing of the engine, and this by means of a control system whose progressiveness and reactivity are as close as possible to those of the accelerator pedal of a classically motorized vehicle.

Patent application EP 1 241 043 describes a traction chain for a series hybrid vehicle in which the driver's demand, when he presses the accelerator pedal, results in a command to open a throttle valve for the engine. The speed of the engine is a consequence of controlling the torque of the electric traction motor(s), an operational mode on which the principle proposed earlier has no direct action. The torque of the traction motors is controlled as a function of the vehicle's speed and as a function of a controlling power P which evaluates the power available at the drive output shaft of the engine at the engine's real speed. The operating mode of the engine does not necessarily correspond to optimum consumption, despite a tendency described in the aforesaid patent application to evolve progressively towards operating modes with lower consumption.

To move rapidly and in a more deterministic way towards optimum operation of a given engine, in particular towards optimum consumption by a given engine, it would be necessary for any driver command to be able to control both a given throttle valve opening and a revolution speed of the engine in question.

SUMMARY OF THE INVENTION

The invention proposes a traction chain for a series hybrid vehicle comprising:
  an engine which drives an alternator;
  at least one electric traction motor connected to the alternator by a rectifier, by an electric line and an inverter, the inverter enabling the electric traction motor(s) to be operated at a torque set value $CC_{set}$, and the electric line enabling the transfer of electric traction power;
  an accelerator available for use by the driver of the vehicle;
  an actuator that acts on the engine;
  a controller of the traction chain loaded with a model of the operation of the engine and loaded with a program which, from the position of the accelerator, makes it possible to obtain a pair ($R_{th/set}$, $PP_{set}$) of set values for the revolution speed $R_{th}$ of the engine and for the position PP of the actuator, the said controller making it possible to:
    control the position of the said actuator on the basis of the said set value $PP_{set}$ for the position of the actuator,
    with calculation iterations, at each iteration, calculate a torque set value $CC_{set}$ for the electric traction motor(s) as a function of the differences between the measured speed $R_{th}$ and the set value $R_{th/set}$ for the revolution speed of the engine in order to match said set value $R_{th/set}$.

It must be stressed immediately that according to one aspect of the present invention, the accelerator control available for use by the driver acts on the torque set value of the electric traction motor so as to absorb more or less power in order, thanks to a speed regulator, to respect the revolution speed chosen. In addition, the accelerator control acts on the actuator which acts on the engine (a throttle valve controlling the air intake in the case of a petrol engine). The two actions are indirect, in the sense that they result from a calculation which will be explained below.

Of course, to the extent that electrical energy is available in the electric line mentioned, it can be envisaged to tap off various electric loads other than the electric traction motor(s). In some cases, be it only in a transitory phase, these other electric loads can absorb considerable electric power, sometimes more than the electric traction motor or even more than the power available. In particular (but not uniquely) in the case when one or other of these loads would be likely to have a large power demand while the traction of the vehicle requires no power, it may be desirable to provide various adaptations, improvements and/or amendments of the control principle explained above, which will be described in detail in what follows.

BRIEF DESCRIPTION OF THE DRAWINGS

The invention will be better understood from the more complete description of a non-limiting example, referring to the attached figures in which.

DETAILED DESCRIPTION OF THE INVENTION

Figure 1:
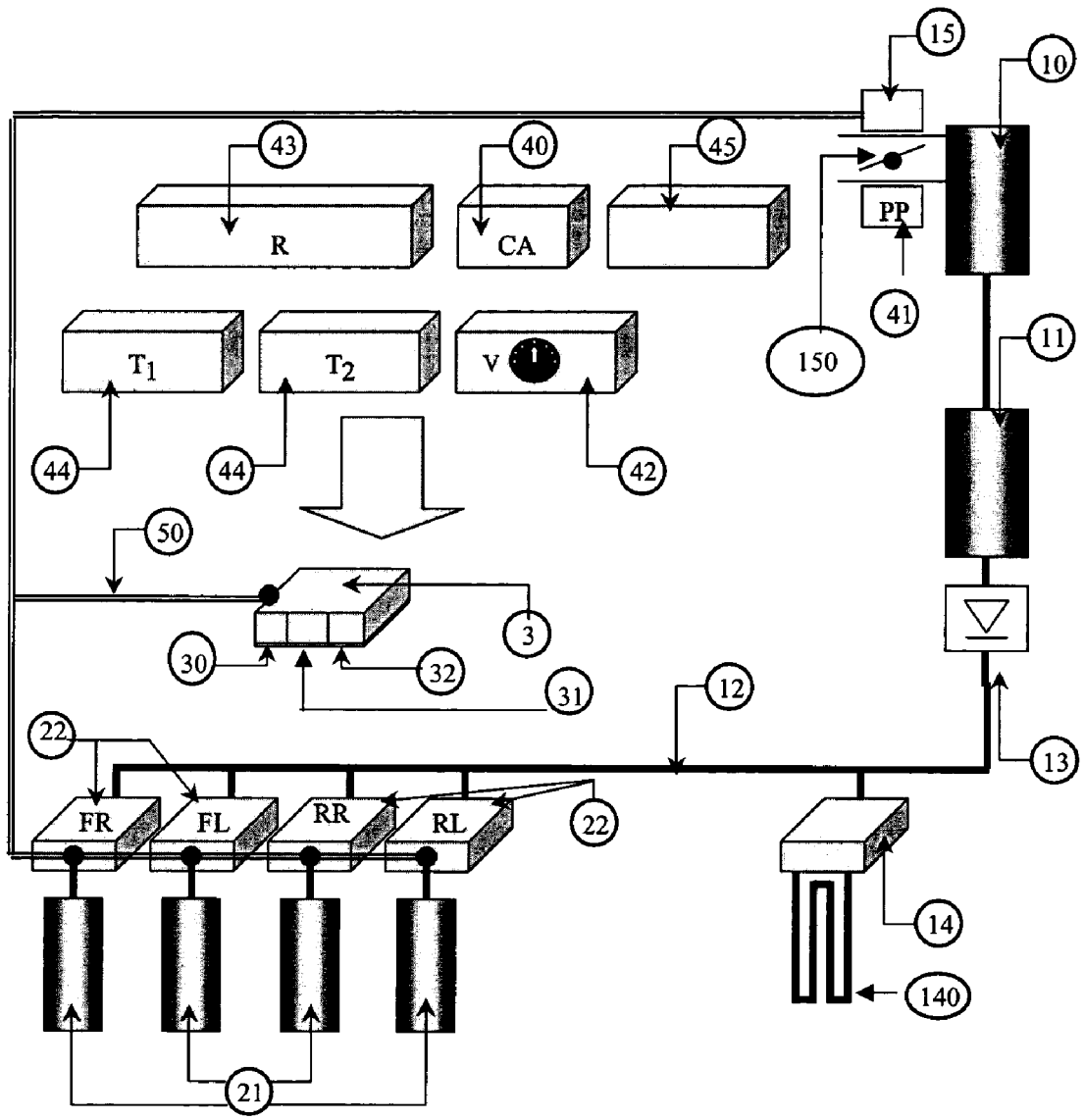
FIG. 1 is a schematic general representation of a traction chain for a series hybrid vehicle according to the invention.

FIG. 1 shows a petrol-driven engine 10 and an actuator 15 of the engine which controls the position PP of a throttle valve 150 in an air intake manifold, to act upon the power output of the engine 10. The engine drives an alternator 11. The electrical energy delivered by the latter is distributed to four electric traction motors 21 via a rectifier 13, an electric line 12 and a inverter 22 for each motor 21. A device 14 that absorbs electrical energy is connected to the electric line 12. The traction chain is managed by a controller 3 of the traction torque and the throttle valve position.

Of course, in the context of the present invention the number of electric traction motors is of little importance. There may be just one motor or several, for example one for each wheel of the vehicle. If there are several electric traction motors, then "torque set value $CC_{set}$" is understood to mean a cumulative overall torque for all the motors, and this invention does not concern itself with the question of distributing that torque between the motors. As regards the type of electric motor, it is a motor whose torque delivered by the shaft can be controlled, in amplitude and in sign, for example a Permanent Magnet Synchronous Motor (PMSM) is used, with flux concentration and an inductor with permanent magnets.

In the example described in detail, the electric traction motors 21 are three-phase synchronous motors equipped with an angular position sensor of the resolver type, and are controlled by inverters 22 under the control of the controller 3. The electronic system is designed to control the motors in their torque. Accordingly, the traction assembly can be used as a drive unit and as a braking unit.

The alternator used is for example an electrical machine of the same type as that proposed for the electrical traction motor. The alternator transforms the mechanical energy available at the output shaft of the engine into electrical energy consumed by the electric load connected to the electric line fed by the said alternator (in this explanation, the electric load is mainly the electric traction motor or motors).

Via a calculation block 30, the controller 3 receives signals evaluating various parameters such as from a potentiometer 40 which reflects the position of an accelerator control CA (a pedal or other equivalent control available for use by the driver of the vehicle), such as a sensor 41 reflecting the position PP of the throttle valve, a sensor 42 giving the speed of the vehicle, a sensor 43 giving the speed $R_{th}$ of the engine, various temperature sensors 44, a sensor 45 giving the pressure in the vehicle's hydraulic braking circuit, this list being non-exhaustive. A control module 32 of the actuator 15 of the engine controls the position of the actuator, i.e. the position of the throttle valve 150. The actuator 15 consists essentially of a small direct-current electric motor coupled to the throttle valve of the engine. This motor is managed by appropriate electronics, and thanks to a position sensor 41 (potentiometer), the throttle valve is permanently maintained in the correct position. An engine speed regulator 31 determines a torque set value for the electric motors 21. The calculation block 30, the speed regulator 31 and the control module 32 perform the necessary calculations in accordance with a selected sampling period.

A CAN® (Controller Area Network) 50 bus provides the communication between the various elements. This allows the controller to receive in particular the speed of the wheel driven by the electric motor 21 and a diagnosis of the operation resulting from the inverters 22, and to emit a torque set value $CC_{set}$ towards the inverters 22.

In a real vehicle, other peripheral elements absorb power delivered by the engine. As far as this invention is concerned, it does not matter if they absorb a mechanical power directly from the crankshaft of the engine or if they absorb an electrical power on the electric line 12, since it is equivalent to absorbing said power from the crankshaft via the alternator. We simply state that certain among these peripheral elements can also be controlled by the controller 3, which has the advantage of allowing to take into account into the calculation block 30 variations of power consumption to calculate a position of the actuator 15 even before the revolution speed of the engine be affected.

We go now on the description of management of the traction chain operation. The potentiometer 40 which reflects the position of accelerator pedal delivers a signal which allows to achieve the three following functions: normal acceleration, highest possible acceleration (comparable to a <<kick-down>> in a classical automatic gearbox), and engine braking. In the following, the operation in engine braking is set aside.

It will be explained how a model of the engine's operation can be created, to serve as a basis for the calculations carried out by the calculation block 30.

Figure 4:
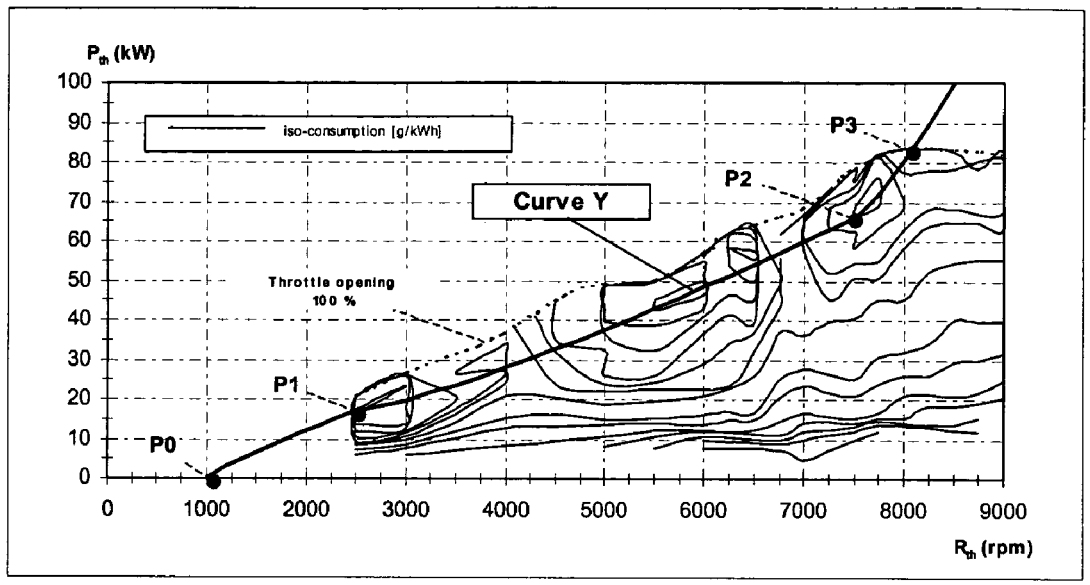
FIG. 4 is a map of the iso-consumptions of the engine drawn in a representation giving the power of the engine (ordinate axis) as a function of its revolution speed (abscissa), a controlling curve V being superimposed on the said map.

For a particular engine, FIG. 4 shows the diagram of the actual power measured experimentally, as a function of speed, for various specific iso-consumption values. The specific iso-consumption curves identify the networks of curves giving the power delivered as a function of a revolution speed at which the engine efficiency is constant, i.e. at which the consumption per unit of power delivered is constant. This is an example of what is nowadays known as the mapping of an engine. Points P1, P2, P3 of lowest consumption for a given delivered power are plotted. P3 is the particular point corresponding to the maximum power of the engine.

Figure 5:
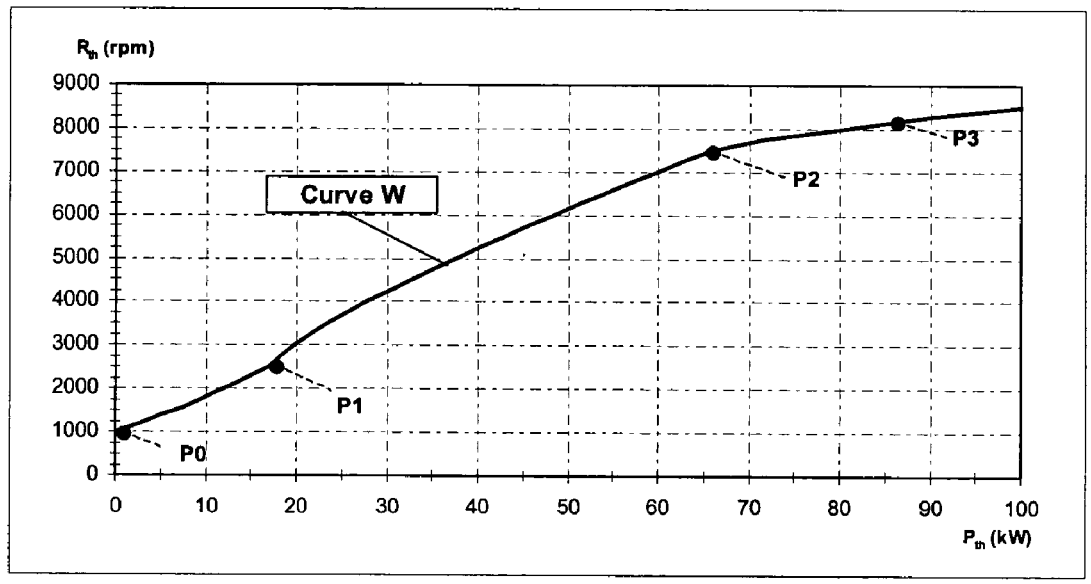
FIG. 5 is the curve W, the reciprocal function of the curve V, drawn in a representation giving the revolution speed of the engine (ordinate axis) as a function of its power (abscissa)

A point P0 is also plotted, which enables the operation at idling. A controlling curve can be constructed, which essentially connects P0 and all these "points of lowest consumption for a given engine power". A particular example among others is given by the curve V in FIG. 4. In FIG. 5 the curve W, which is the reciprocal function of curve V, establishes the correspondence between the speed set value of a "lowest consumption" mode (ordinate axis) and the set value of the engine's power (abscissa). For the curve in FIG. 5 the same notation is used for the points P0, P1, P2 and P3 because there is a simple permutation between the abscissa and the ordinate. This curve W can be modeled in the calculation block 30 by a first equation. The expression of this equation between the points P0 and P1 is:

$$R_{th/set} = (R_{th1} - R_{th0}) \cdot \frac{(P_{th/set} - P_{th0})^n}{(P_{th1} - P_{th0})^n} + R_{th0}$$

in which ($P_{th0}$, $R_{th0}$) and ($P_{th1}$, $R_{th1}$) are the respective coordinates of the points P0 and P1, and n is a coefficient enabling the concavity of the curve to be adjusted.

In the same way, expressions of this first equation can easily be written between the points P1 and P2, and then between the points P2 and P3.

Figure 6:
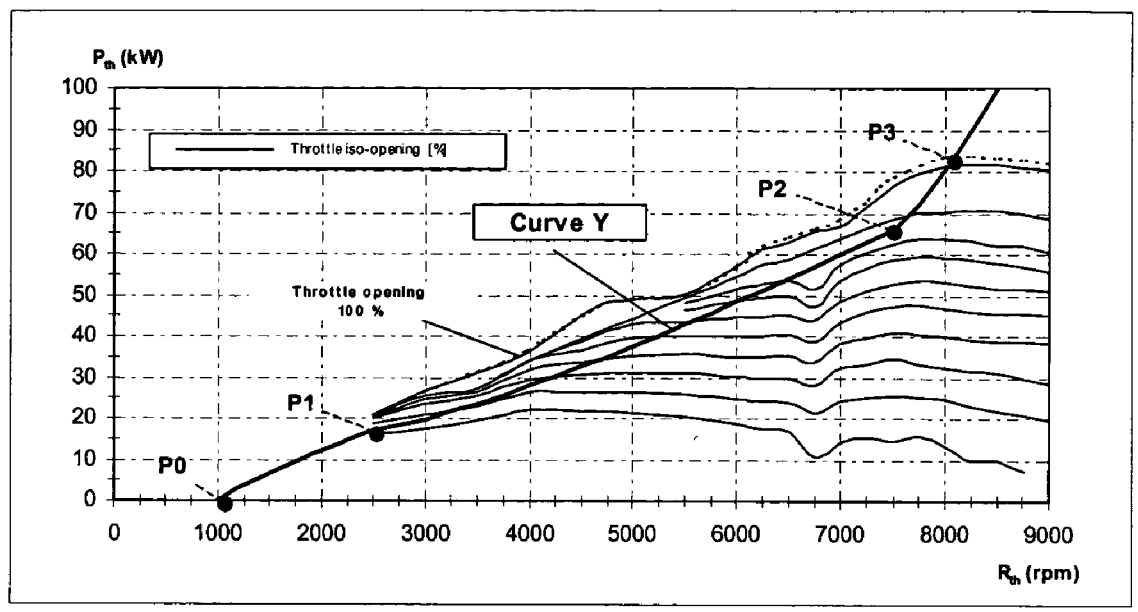
FIG. 6 is a map of the iso-openings of the throttle valve of the engine drawn in a representation giving the power of the engine (ordinate axis) as a function of its revolution speed (abscissa), the controlling curve described in FIG. 4 being superimposed on the said map.

FIG. 6 shows the diagram of actual power measured experimentally, as a function of speed, for different throttle valve openings. In FIG. 6 the controlling curve V described in FIG. 4 has been drawn in.

Figure 7:
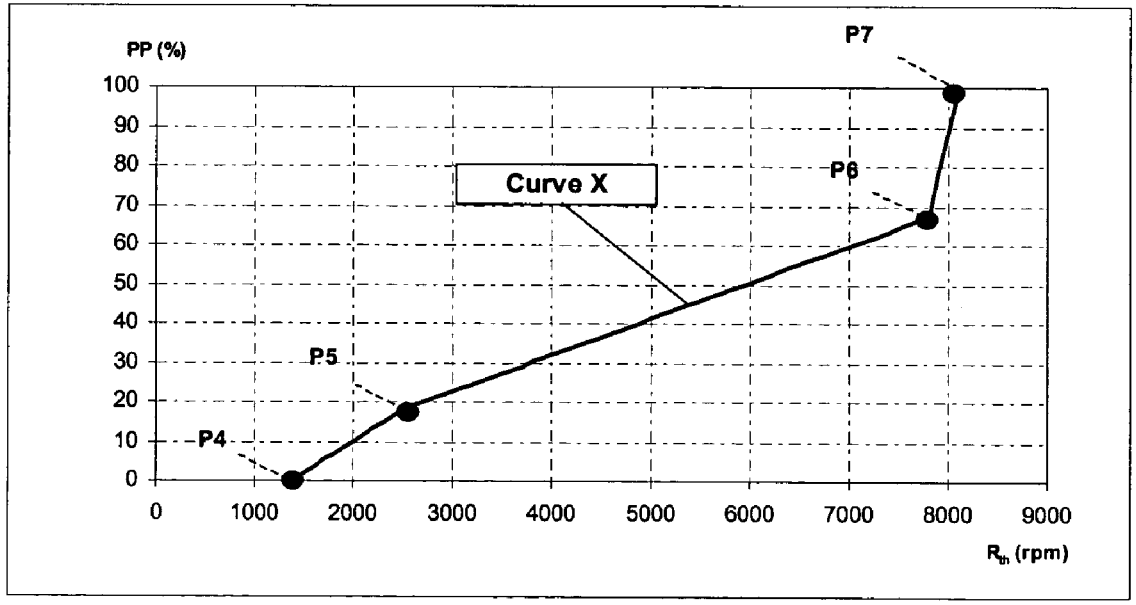
FIG. 7 is a controlling curve X of the position of a throttle valve that acts on the engine, as a function of the revolution speed of the said engine.

FIG. 7, in turn, is a model of the intersection of the controlling curve V of FIG. 6 with the throttle valve iso-opening curves. This model is the curve X, which establishes the correspondence between the set value of the throttle valve opening and the speed set value for the "lowest consumption" mode. The curve X is a second equation, obtained by linearization in parts between the individual points P4, P5, P6 and P7. These are chosen appropriately to make the model as true to reality as possible, in this case having regard to a lowest consumption objective. The model (curve X) loaded into the calculation block 30 is the second equation. The expression of that equation between points P4 and P5 is:

$$PP_{set} = (PP_5 - PP_4) \cdot \frac{(R_{th/set} - R_{th4})}{(R_{th5} - R_{th4})} + PP_4$$

in which ($R_{th4}$, $PP_4$) and ($R_{th5}$, $PP_5$) are the respective coordinates of the points P4 and P5.

In the same way, expressions of this second equation can easily be written between the points P5 and P6, and then between the points P6 and P7.

In an equivalent way, the models expressed by the first and second equations given above could also have been introduced into the calculation block 30 by tables of points.

Thanks to these controlling curves, a particular model has been constructed which enables the engine to be controlled in accordance with a particular objective, in this case to obtain the lowest specific consumption.

Thus, in a particular but advantageous embodiment of the invention, the traction chain is such that the said model comprises at least a first equation (or a table of points or more generally a curve) giving the speed $R_{th}$ as a function of the engine power $P_{th}$ available at the output shaft of the engine and at least a second equation (or a table of points or more generally a curve) giving the position PP of the actuator as a function of the speed $R_{th}$, the said program making it possible to translate the effective position of the accelerator CA into an engine power set value $P_{th/set}$ and then translating this latter into a speed set value $R_{th/set}$ and finally translating the speed set value into a position set value $PP_{set}$ of the actuator.

As a variant, it would be possible to translate the engine power set value $P_{th/set}$ directly into a position set value $PP_{set}$ of the actuator. In yet another variant the said model could first translate the engine power set value $P_{th/set}$ into a position set value $PP_{set}$ of the actuator and then this latter into a speed set value $R_{th/set}$.

In the context of the present invention, using in the model an equation or a table of points or a descriptive curve are solutions equivalent to one another, from which the skill man will choose the most appropriate in each case. This being clearly established, nothing further will be said in what follows concerning these equivalences.

We have seen that the said first and second equations both represent an operational mode of the engine with minimum specific fuel consumption. This of course is only a particular case. As a variant, a model could be constructed in which the said first and second equations both represent an operational mode of the engine with the lowest pollutant emission. Or again, one could seek to minimize vehicle noise, or engine wear. One could seek to maximize vehicle performance. In addition, the model can be changed in a dynamic way, either automatically for example depending on the location of the vehicle (which the calculation block 30 can know thanks to a GPS system), or manually.

We will now consider how this model for controlling the traction chain of the invention can be used. From the curves W in FIG. 5 and X in FIG. 7 and/or the corresponding equivalent equations, and from a power demand which, as will be seen later, can be estimated on the basis of the accelerator's position, an operating point of the engine can be calculated which is defined by a pair (optimum according to the criterion retained for constructing the model) of values for the engine speed and for the throttle valve position. The position of the throttle valve is controlled directly and the engine is stabilized at that revolution speed by controlling the torque of the electric traction motor(s) so that the total electrical power consumed balances the engine power available at this appropriately chosen speed.

Figure 3:
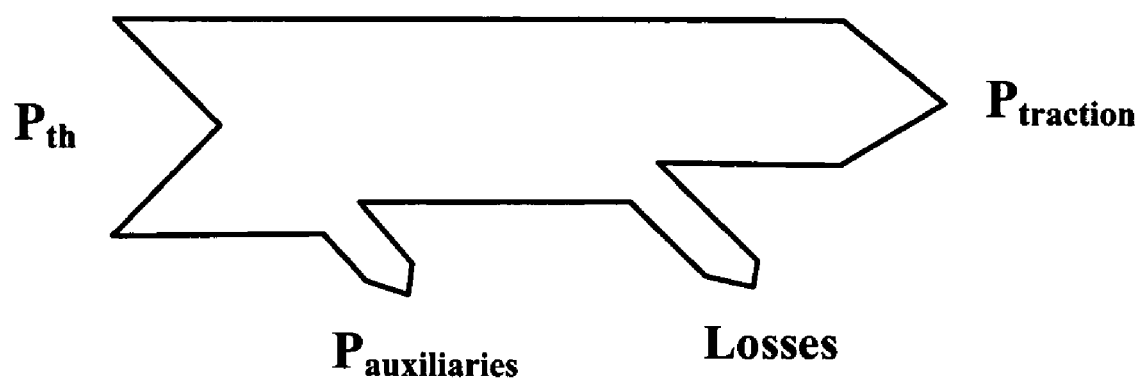
FIG. 3 represents the power balances in force.
Figure 9:
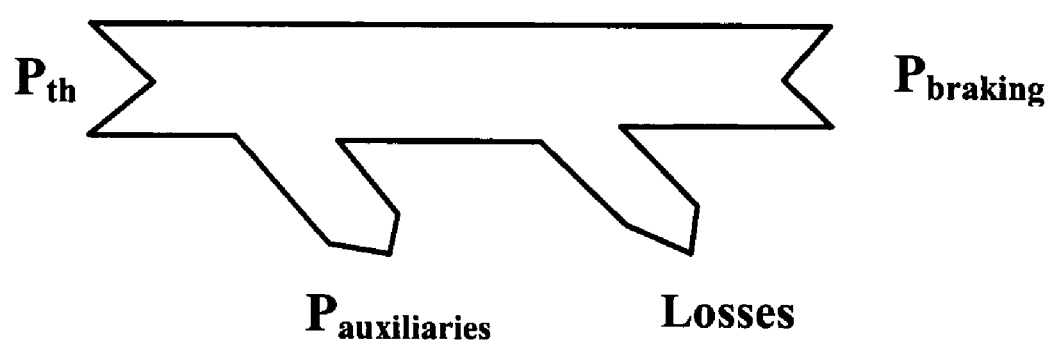
FIG. 9 represents the power balances in force.

FIG. 3 is a schematic illustration of the powers called into play. The power delivered by the engine (on the left of the diagram) is absorbed by all the consumers connected to the electric line (accessories or even essential elements such as electric steering or electric suspension) and the peripherals of the engine, the group of these consumers being referred to as "auxiliaries", by the losses in the various elements, and by the electric traction, the latter being permanently adjusted so as to balance the power delivered by the engine.

Figure 2:
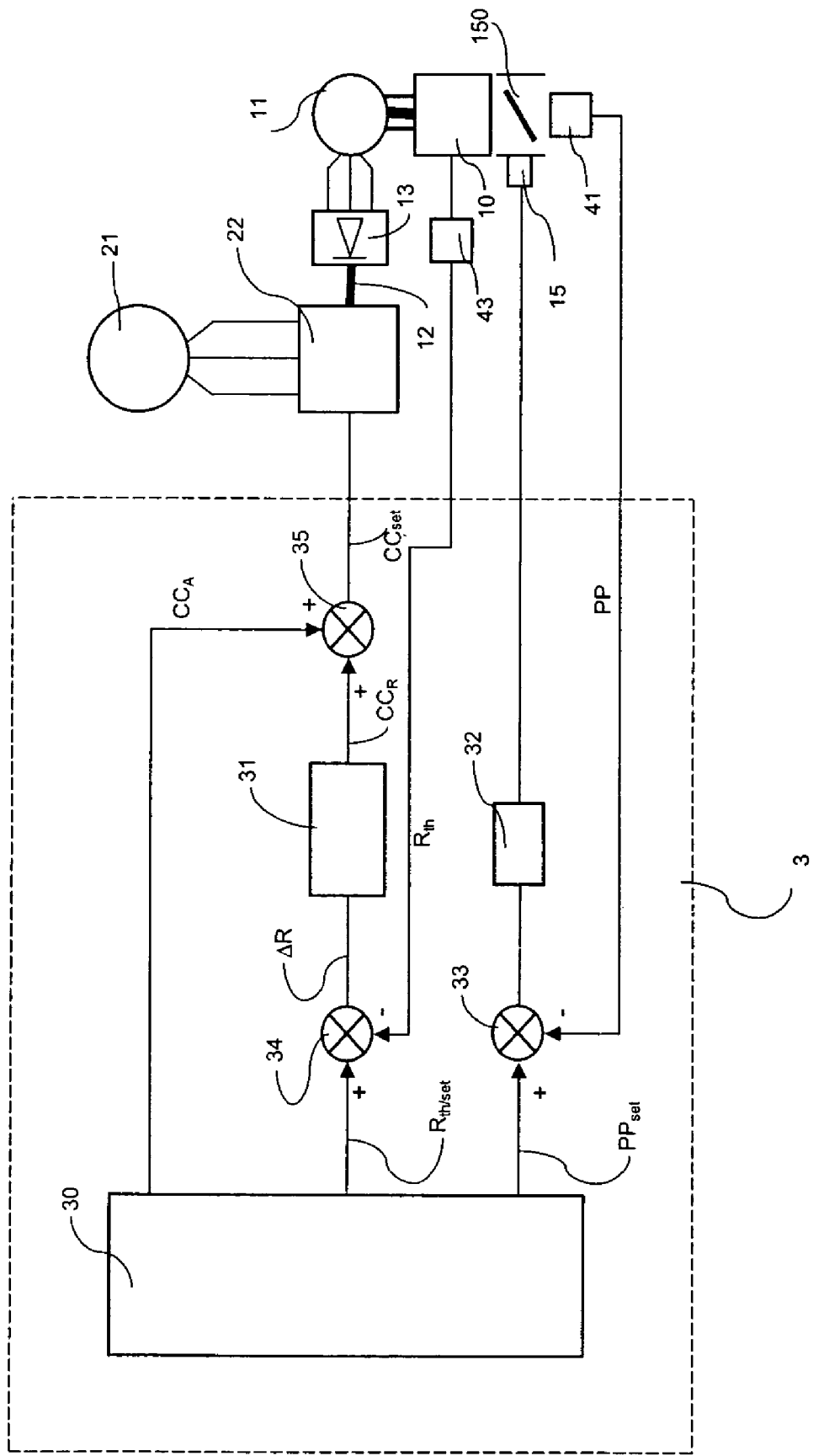
FIG. 2 is a block diagram describing the operation of the invention.

As shown in FIG. 2, the calculation block 30 sends to a positive input of a summation unit 33 the set value for the position $PP_{set}$ of the actuator 15, a set value determined as explained earlier. At a negative input the summation unit 33 receives a measurement of the actual position PP of the actuator, via the sensor 41. The control module 32 of the actuator adjusts the position of the throttle valve so that it conforms to the value calculated by the calculation block 30.

FIG. 2 also shows that the calculator 30 sends to a positive input of a summation unit 34 the speed set value $R_{th/set}$, again determined as explained earlier. At a negative input the summation unit 34 receives a measurement of the actual revolution speed $R_{th}$ of the engine 10 via the sensor 43. The speed regulator 31 receives a signal which images the differences between the speed set value $R_{th/set}$ and the actual revolution speed $R_{th}$ of the engine 10, and from that difference determines a correction value $CC_R$ for the torque set value $CC_{set}$ of the electric motor(s). Any difference between the actual speed and the speed set value (in this case, to achieve a situation of lowest consumption) is dealt with by a correction, adjusting the torque of the electric traction motor(s). If the actual revolution speed is higher than the speed set value, it is appropriate to increase the load on the engine, which is done by increasing the traction torque at the electric motor(s) 21, and conversely. At each calculation iteration the torque set value $CC_{set}$ is modified in the above sense until the speed set value is complied with, and the torque set value $CC_{set}$ is then kept at the value attained.

It must be stressed that the model explained above and represented by the curves W in FIG. 5 and X in FIG. 7 (and/or equations 1 and 2, or a table of points or more generally a curve) is not in any way imperative. Numerous other curves and/or equations could enable the engine to operate, in particular as a function of objectives other than the lowest consumption or by virtue of simpler curves to be expressed as equations and ones with a more arbitrary character.

Applying this principle uncorrected, and remembering that the voltage delivered by the alternator coupled to the engine is itself, as a first estimate, proportional to the speed of the alternator and hence that of the engine, it is possible to come up at a traction situation which cannot be realized because there is insufficient voltage for the electric traction motor(s) on the electric line 12. Remember that the minimum voltage required by an electric traction motor is a function of its speed, its torque and its intrinsic electrical characteristics.

To avoid this situation a minimum threshold is imposed on the revolution speed of the engine, which guarantees a sufficient voltage for the traction motor(s). The traction chain is such that the said program enables the determination of a dynamic minimum speed threshold $R_{th/set/min}$ for the speed set value such that the voltage delivered by the alternator and the rectifier to the electric line 12 is higher than or equal to the minimum supply voltage of the electric traction motor(s), the said dynamic minimum threshold taking account of the vehicle's speed, the torque set value $CC_{set}$, and the engine power set value $P_{th/set}$. The principle of regulating the speed by acting on the torque of the electric motor(s) remains identical. The set value for the position of the actuator 15 is unchanged, and the situation shifts along one or other of the throttle valve iso-opening curves (curves having a wide, essentially horizontal range) of FIG. 6.

A particular, but non-limiting example of the translation of the accelerator's position CA into a set value for the engine power $P_{th/set}$ will now be explained, with the help of FIG. 8.

A first part (Zone 1) corresponds to an operational zone in which the limiting factor is the maximum torque $C_{max}$ of which the electric traction motor(s) is/are capable. As a reminder, the electric motor(s) used can develop a torque, proportional to the current, essentially constant throughout the whole range of revolution speeds for which it is/they are designed. In this Zone 1 the engine cannot be operated at its maximum engine power $P_{max}$ because the electric motor(s), operating at low revolution speed, cannot absorb all the power from it, whereas it is/they are working at it/their maximum torque $C_{max}$. From a transition speed $V_t$, there is then a second operating zone (Zone 2) in which the limiting factor is the power that can be delivered by the engine. In effect, in this zone and having regard to its/their revolution speed which has become high, the electric traction motor(s) absorb the maximum engine power $P_{max}$ at a torque (and therefore current) level lower than its/their maximum torque.

Figure 8:
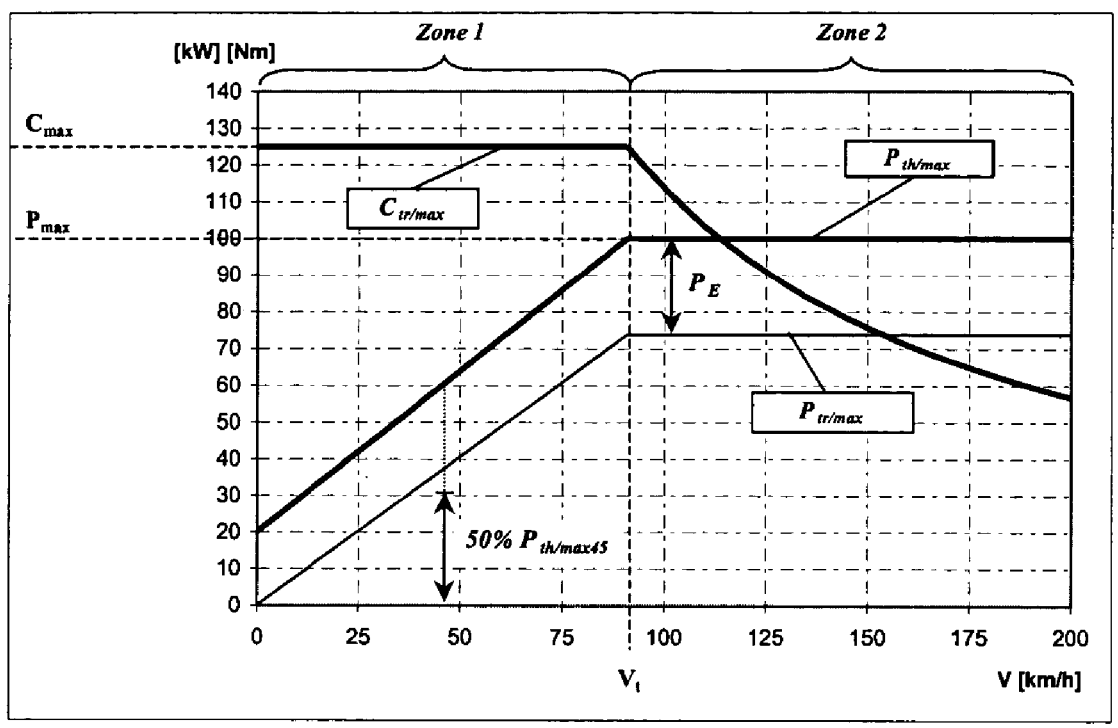
FIG. 8 shows a curve representing the maximum engine power to be developed by the engine as a function of the speed at which the vehicle is travelling, and a curve representing the corresponding maximum torque to be developed by the electric traction motor(s), as a function of the vehicle's travel speed.

Knowing the maximum torque $C_{max}$ that the traction motor(s) can deliver, as shown in FIG. 8, it is thus possible to deduce the maximum traction power as a function of the vehicle's speed (curve $P_{th/max}$). The maximum engine power at which the engine can be operated (curve $P_{th/max}$) is greater than the previous one, the difference resulting from an estimation of the losses $P_E$.

In Zone 1 the maximum engine power corresponds to the sum of the traction power that can be used at the current speed of the vehicle when the electric traction motor(s) is/are operating at maximum torque $C_{max}$, and an estimation of the total losses (alternator, inverters, etc) for the use of the maximum torque $C_{max}$ of the traction motor(s). When this power is equal to the maximum engine power $P_{max}$, the speed limit at which the maximum traction torque can be used is reached (end of Zone 1). Having reached the maximum power $P_{max}$ of the engine, and hence the maximum traction power, the maximum traction torque is accordingly limited and recalculated as a function of the vehicle's speed (Zone 2).

To know the power set value $P_{th/set}$ that must be delivered to the engine, the effective position of the accelerator control CA is translated, whether linearly or not, into a percentage of the maximum power possible at the instantaneous speed of the vehicle. Thus, for example, if the vehicle is travelling at 45 km/h and the accelerator is half-way down, the power set value $P_{th/set}$ for the engine will be 50% of the maximum possible controlling power $P_{th/max}$ at 45 km/h. This value can be used in accordance with the model explained earlier.

We will now see how a torque set value known as the anticipated torque $CC_A$ can also be calculated for the electric traction motor(s). To know the anticipated torque $CC_A$, the effective position of the accelerator control CA is translated, whether linearly or not, into a percentage of the maximum torque possible at the instantaneous speed of the vehicle (see curve $C_{th/max}$ in FIG. 8). Thus, for example, if the vehicle is travelling at 45 km/h and the accelerator is half-way down, the anticipated torque will be 50% of the maximum torque possible at 45 km/h, or $C_{max}/2$. This is a value sent by the calculation block 30 to the summation unit 35 (see FIG. 2). Thus, the said controller 3 comprises a program that enables an anticipated value $CC_A$ of the torque set value of the electric traction motor(s) to be calculated, and a torque set value $CC_{set}$ to be delivered to the electric traction motor(s), equal to the sum $CC_{set}=CC_A+CC_R$.

The advantage of this anticipation is that convergence towards the proper revolution speed of the engine is much more rapid. But this anticipation is in no way imperative. If it does not exist, the speed error of the engine will be such that the correction component $CC_R$ due to this error is larger. The torque set value $CC_{set}$ will be entirely determined by the output of the speed regulator 31.

Of course, the traction chain according to the invention can also comprise, as already known in its own right, a device capable of absorbing electrical energy connected to the said electric line, such as an energy-dissipating electrical resistance 140. In all cases it is connected to the electric line via a braking control unit 14, the said braking control unit preferably being activated when the accelerator CA is for example below a predetermined threshold. In this way the controller 3 then sends a braking torque set value $CC_{set}=CC_f$ to the electric motor(s). The predetermined threshold can be constant and zero (accelerator pedal released). It is advantageous for the predetermined threshold of the accelerator control CA to be proportional to the speed of the vehicle.

The controlling principle of a traction chain as described so far is suitable for most vehicle configurations. But as already mentioned, there are particular vehicle configurations in which, in certain application instances which are also particular cases, it is necessary to cater for a large power demand by other vehicle equipment while the engine is not under load. This could be the case if a vehicle with electrically assisted steering or a vehicle with active electrical suspension, in all cases the vehicle having no or insufficient accumulation capacity for storing electrical energy. It will then be advantageous to provide that during these phases the regulation system operates as indicated below.

In these cases, it can be that the engine power set value $P_{th/set}$ calculated from the accelerator control CA is insufficient to satisfy the power demand of the said auxiliary consumers. The accelerator pedal is pressed only slightly or even totally released. In that case, the traction torque and hence the power to be supplied for traction are zero, or even negative in a braking phase.

It is appropriate to provide two modes of operation for calculating the set value $PP_{set}$ for the actuator 15: the normal mode explained above (in which the calculation block 30 determines the set value $PP_{set}$ for the actuator 15 from the curve X) and a mode which could be described as the auxiliary service mode. In this case, when the accelerator pedal is fully released, the calculation block 30 determines the set value $PP_{set}$ for the actuator 15 so as to regulate the speed of the engine to a minimum threshold that enables it to deliver a maximum power of the order of the peak power that can be absorbed, in the worst-case scenario, by the auxiliary equipment in question.

There is a second case for which it is advantageous to provide a third, specific mode of operation: this is the maneuver known as kick-down, by which the driver expresses a priority demand for maximum traction torque. In this case, if the vehicle is travelling below the transition speed $V_t$, the limiting elements is the traction motor(s), which reach its/their maximum toque at a level of absorbed power lower than the engine power that can be delivered by the engine. It is therefore impossible to be certain about preventing the engine from racing by regulating its speed by the load imposed by the traction motors. Consequently, in the so-termed "kick-down" mode of operation, the calculation block 30 determines the set value $PP_{set}$ for the actuator 15 in such manner that it regulates the speed of the engine to its set value $R_{th/set}$".

It should of course be understood that the use of the two operating modes described above, which depart fleetingly from the basic traction chain regulation principle described earlier, as well as any other mode of operation adopted fleetingly to respond to a particular and temporary objective, are to be regarded as within the scope of the invention since there exists a mode of operation which complies with the characteristics specified in the claims.

What is claimed is:

1. Traction chain for a series hybrid vehicle comprising:
   an engine (10) which drives an alternator (11);
   at least one electric traction motor (21) connected to the alternator by a rectifier (13), by an electric line (12) and a inverter (22), the inverter enabling the electric traction motor(s) to be operated at a torque set value $CC_{set}$, and the electric line enabling the transfer of electric traction power;
   an accelerator (CA) available for use by the driver of the vehicle;
   an actuator (15) that acts on the engine;
   a controller (3) of the traction chain loaded with a model of the operation of the engine and loaded with a program which, from the position of the accelerator, makes it possible to obtain a pair ($R_{th/set}$, $PP_{set}$) of set values for the revolution speed $R_{th}$ of the engine and for the position PP of the actuator (15), the said controller making it possible to:
   control the position of the said actuator on the basis of the said set value $PP_{set}$ for the position of the actuator,
   with calculation iterations, at each calculation iteration, calculate a torque set value $CC_{set}$ for the electric traction motor(s) as a function of the difference between the measured speed $R_{th}$ and the set value $R_{th/set}$ for the revolution speed of the engine in order to match said set value $R_{th/set}$.

2. Traction chain according to claim 1, in which said model comprises at least a first equation giving the speed $R_{th}$ as a function of the engine power $P_{th}$ available at the output shaft of the engine and at least a second equation giving the position PP of the actuator as a function of the speed $R_{th}$, and in which the said program enables the effective position of the actuator CA to be translated into an engine power set value $P_{th/set}$ and then the engine power set value $P_{th/set}$ to be translated into a speed set value $R_{th/set}$ and then the speed set value to be translated into an actuator position set value $PP_{set}$.

3. Traction chain according to claim 1, in which the said model comprises at least a first equation giving the speed $R_{th}$ as a function of the engine power $P_{th}$ available at the output shaft of the engine and at least a second equation giving the position PP of the actuator as a function of the engine power $P_{th}$, and in which the said program enables the accelerator position to be translated into an engine power set value $P_{th/set}$ and then the engine power set value $P_{th/set}$ to be translated into a speed set value $R_{th/set}$ and the engine power set value $P_{th/set}$ to be translated into an actuator position set value $PP_{set}$.

4. Traction chain according to claims 2 or 3 in which the said first and second equations both represent an operational mode of the engine in which the specific fuel consumption is minimum.

5. Traction chain according to claims 2 or 3 in which the said first and second equations both represent an operational mode of the engine in which the pollutant emission is minimum.

6. Traction chain according to any of claims 1, 2 or 3, also comprising a device capable of absorbing electrical energy, connected to the said electric line via a braking control unit (14) and in which the said braking control unit is activated when the accelerator CA is below a predetermined threshold, so as to command the controller to send to the at least one electric motor a braking torque set value $CC_{set}=CC_f$.

7. Traction chain according to claim 4, also comprising a device capable of absorbing electrical energy, connected to the said electric line via a braking control unit (14) and in which the said braking control unit is activated when the accelerator CA is below a predetermined threshold, so as to command the controller to send to the at least one electric motor a braking torque set value $CC_{set}=CC_f$.

8. Traction chain according to claim 5, also comprising a device capable of absorbing electrical energy, connected to the said electric line via a braking control unit (14) and in which the said braking control unit is activated when the accelerator CA is below a predetermined threshold, so as to command the controller to send to the at least one electric motor a braking torque set value $CC_{set}=CC_f$.

9. Traction chain according to claim 6, in which the said predetermined threshold of the accelerator control CA is proportional to the speed of the vehicle.

10. Traction chain according to claim 1, in which the said program enables the determination of a dynamic minimum speed threshold $R_{th/set/min}$ for the speed set value such that the voltage delivered by the alternator (11) and the rectifier (13) to the electric line (12) is greater than or equal to the minimum supply voltage of the electric traction motor(s) (21), the said dynamic minimum threshold taking account of the speed of the vehicle, the torque set value $CC_{set}$ and the engine power set value $P_{th/set}$.

11. Traction chain according to claim 1, in which the said controller comprises a program enabling the calculation of an anticipated value $CC_A$ of the torque set value of the electric traction motor(s), and the delivery of a torque set value $CC_{set}$ to the electric traction motor(s) equal to the sum $CC_{set}=CC_A+CC_R$.

12. Traction chain according to claim 2, in which the said program enabling the translation of the accelerator position into an engine power set value $P_{th/set}$ determines, from the accelerator position, a percentage "x %" of a maximum engine power $P_{th/max}$ that can be absorbed by the vehicle, and determines the said maximum engine power $P_{th/max}$ from the speed of the vehicle.

13. Traction chain according to claim 3, in which the said program enabling the translation of the accelerator position into an engine power set value $P_{th/set}$ determines, from the accelerator position, a percentage "x %" of a maximum engine power $P_{th/max}$ that can be absorbed by the vehicle, and determines the said maximum engine power $P_{th/max}$ from the speed of the vehicle.

* * * * *

UNITED STATES PATENT AND TRADEMARK OFFICE
CERTIFICATE OF CORRECTION

| | | |
|---|---|---|
| PATENT NO. | : 7,096,098 B2 | Page 1 of 1 |
| APPLICATION NO. | : 10/732014 | |
| DATED | : August 22, 2006 | |
| INVENTOR(S) | : Thierry Auguet et al. | |

It is certified that error appears in the above-identified patent and that said Letters Patent is hereby corrected as shown below:

<u>TITLE PAGE [30] FOREIGN PATENT DOCUMENTS</u>

"02 15878" should read --02/15878--.

<u>COLUMN 4</u>

Line 53, "be" should read --is--.

<u>COLUMN 6</u>

Line 26, "the skill" should read --a person skilled in the art--.
Line 27, "man" should be deleted.

<u>COLUMN 8</u>

Line 7, "it/their" should read --its/their--.

<u>COLUMN 9</u>

Line 20, "if" should read --for--.
Line 50, "elements is" should read --element(s) is/are--.

Signed and Sealed this

Twentieth Day of November, 2007

JON W. DUDAS
*Director of the United States Patent and Trademark Office*